Figure 1:
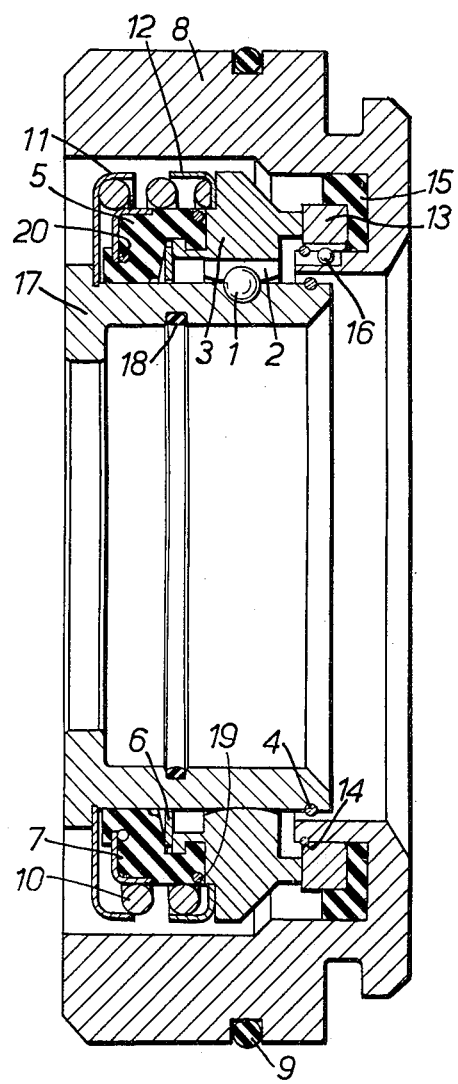

United States Patent [19]
Coleman

[11] 3,938,812
[45] Feb. 17, 1976

[54] DEVICES FOR MAKING FLUID-TIGHT JOINTS BETWEEN TWO RELATIVELY ROTATING PARTS

[76] Inventor: Edgar Padbury Coleman, 197 Tentelow Lane, Southal, Middlesex, England

[22] Filed: June 19, 1973

[21] Appl. No.: 371,436

[30] Foreign Application Priority Data
June 20, 1972 United Kingdom............... 28719/72

[52] U.S. Cl. ...................... 277/41; 277/36; 277/92; 277/84
[51] Int. Cl.² ............................................ F16J 9/00
[58] Field of Search ............ 277/36, 41, 42, 43, 92, 277/84

[56] References Cited
UNITED STATES PATENTS

| | | | |
|---|---|---|---|
| 2,395,095 | 2/1946 | Brady, Jr. | 277/92 X |
| 2,912,265 | 11/1959 | Brummer | 277/36 |
| 2,984,506 | 5/1961 | Andresen | 277/42 |
| 3,588,127 | 6/1971 | Coleman | 277/92 |
| 3,788,650 | 1/1974 | Place | 277/43 |

Primary Examiner—Samuel B. Rothberg
Attorney, Agent, or Firm—Seidel, Gonda & Goldhammer

[57] ABSTRACT

A gland for making a fluid tight seal between a casing and a sleeve which were rotatable with respect to each other is disclosed. The gland comprises a rubbing ring mounted in a casing, a floating ring keyed to said sleeve, and a spring acting between said sleeve and said floating ring to urge said floating ring into engagement with said rubbing ring. A first part of a sealing ring of fluid-resistant elastomeric material is mounted in a recess of one of said sleeve and floating ring and forms a seal with at least one wall surface of said recess. A second part of said sealing ring forms a sliding seal with the surface of the other of said sleeve and floating. An L-shaped rubbing ring has a first surface abutting said floating ring, a second surface substantially parallel to said first surface and adapted to abut a step in said casing and a third surface substantially perpendicular to and intersecting said second surface. A cuff, positioned between said casing and rubbing ring and spaced from said second surface of said rubbing ring forms a seal with said third surface of said rubbing ring. The outer diameter of said floating ring where it abuts the said first surface of said rubbing ring is greater than the inner diameter of said cuff where it forms said seal with said rubbing ring.

5 Claims, 10 Drawing Figures

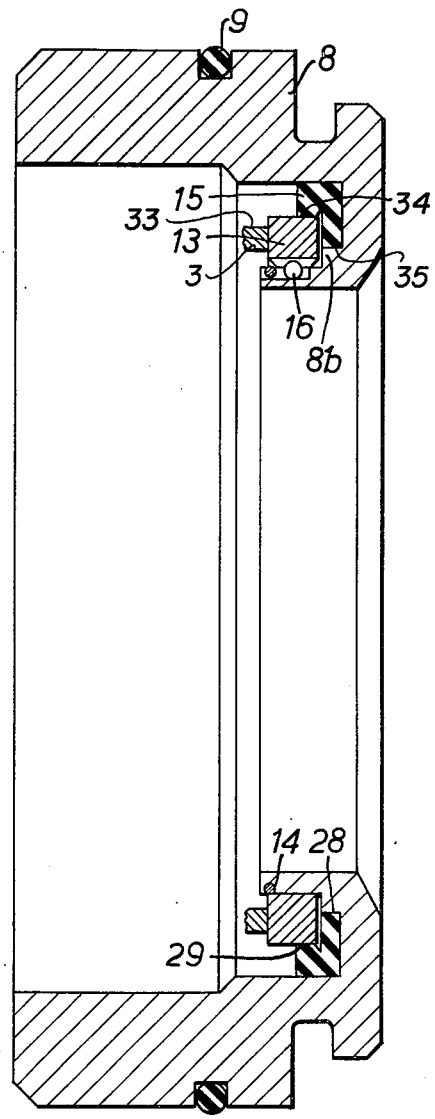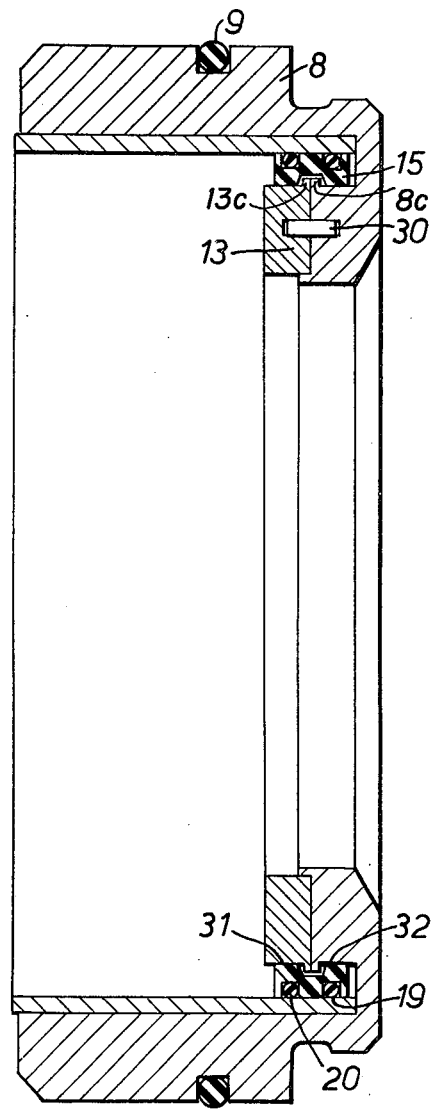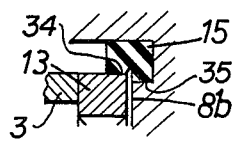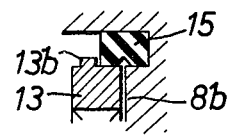

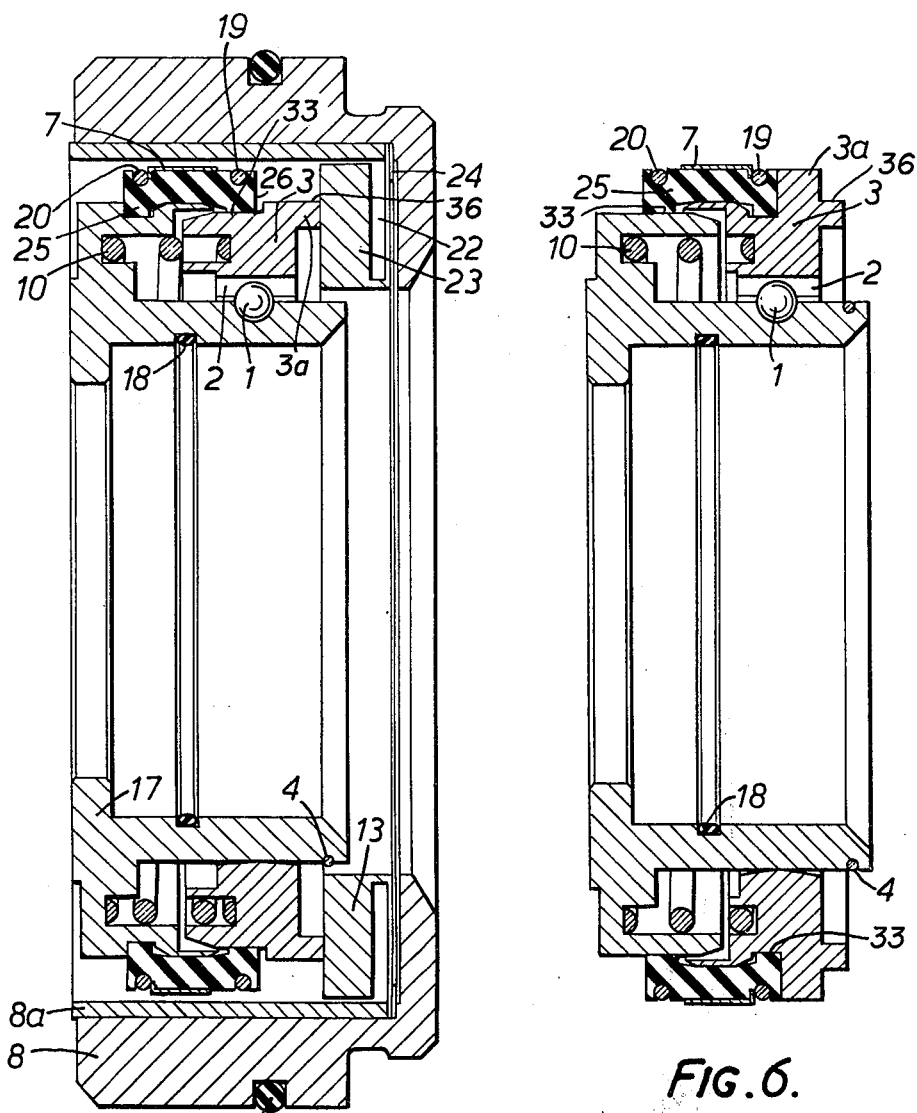

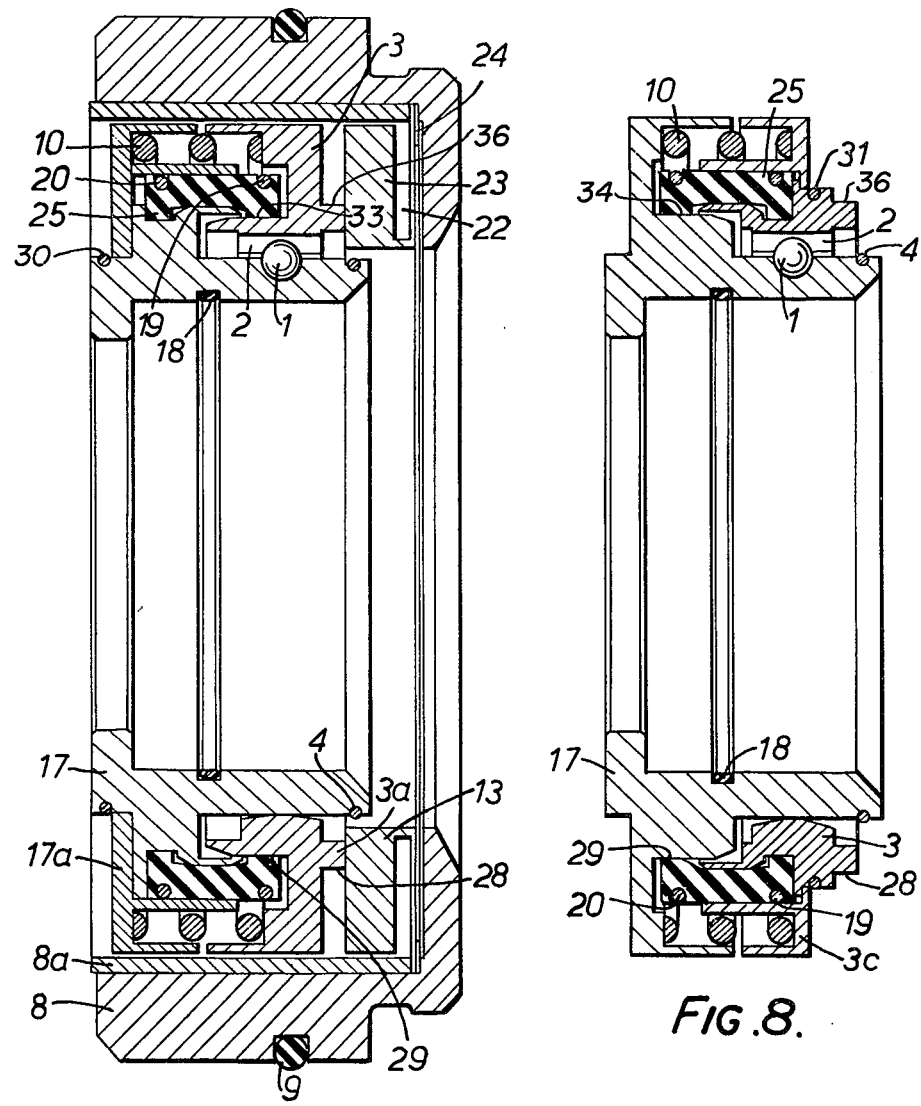

DEVICES FOR MAKING FLUID-TIGHT JOINTS BETWEEN TWO RELATIVELY ROTATING PARTS

The present invention relates to devices for making fluid-tight joints between two relatively rotating parts such as a shaft and a casing and more particularly to an improved form of the device described and claimed in my British Pat. No. 1,148,554.

The device described in such patent relies for sealing upon a first substantially L-shaped cuff of fluid resisting elastomeric material and a second flexible cuff of similar material designed to flex whilst maintaining a seal to permit relative movement between the members with which it co-operates against the action of a helical spring disposed around such flexible cuff.

It has now been found that in certain applications of the device of my patent the tendency is for higher pressures and higher temperatures to prevail in use in relation to those for which the device was designed, and that under these conditions there is an increased risk of failure of the cuff seals. The failure of the L-shaped cuff seal is thought to be due to the material of the cuff being extruded out of its design position and shape by the pressure exerted upon the cuff in use of the device and it is an object of the invention to overcome this source of failure of the seal. The failure of the flexible cuff seal is thought to be due at least in part to the effect of localised heating upon the material of the cuff reducing its ability to flex whilst maintaining a seal. It is also an object of the invention to overcome this source of failure.

To achieve these objects the invention contemplates a redesigning of the relatively movable parts of the device to reduce the pressure with which such parts bear against each other in use and thus reduce the local generation of heat, coupled with a redesigning of the flexible cuff to provide a sliding seal so that it is no longer necessary for such cuff to flex in order to accommodate relative movement between the parts to which such cuff seals. Additionally the invention contemplates a redesigning of the parts accommodating the L-shaped cuff to protect the latter from the effect of axially directed forces tending to cause extrusion of the material of the cuff. The individual modifications of the basic device of my British Pat. No. 1,148,554 can be applied either individually or in combination with varying degrees of advantage under different conditions of use, and in the following description various examples of such applications are dealt with in detail, reference being made to the accompanying drawings of which:

FIG. 1 is an axial section through a fluid coupling gland in accordance with my British Pat. No. 1,148,554, FIG. 2 is a similar section of such a gland modified by the incorporation of improved arrangements of both the flexible cuff and of the L-shaped cuff seal and the mountings thereof, FIG. 3A is a similar section of the housing part of such a gland with the internal part omitted showing an alternative mounting arrangement of the cuff seal and FIGS. 3B and 3C are fragmentary sections showing two alternative forms of and mounting arrangements of the cuff seal, FIG. 4 is a section similar to that of FIG. 3A showing the use of a U-shaped cuff in place of the L-shaped cuff seal of FIG. 2, FIG. 5 is a section similar to that of FIG. 2 without an L-shaped cuff seal, FIG. 6 shows a modification of the gland of FIG. 5, FIG. 7 shows an alternative arrangement of the cuff of the gland of FIG. 5 and FIG. 8 shows a modification of the gland of FIG. 7.

In all the figures of the drawings the same references denote the same parts of the gland and it will therefore suffice to describe only the points of difference between the various constructions. The gland of FIG. 1 is fully described in my British Pat. No. 1,148,554 and comprises, briefly, a housing 8 in which a rubbing ring 13 is sealed by an L-shaped cuff seal 15 and located in position by a locking ball 16 and a circlip 14. In housing 8 is disposed a relatively rotatable sleeve 17 carrying a floating ring 3 sealed to sleeve 17 by a flexible cuff 5 and urged against rubbing ring 13 by a coil spring 10. Ring 3 is keyed to sleeve 17 by a ball 1 and key 2. A circlip 4 is provided in the sleeve 17 substantially in alignment with the circlip 14. Cuff 5 is held on ring 3 and on sleeve 17 by spring bands 19 and 20 and backing plate 6 and retaining plate 7, and is housed together with spring 10 within cover plates 11, 12.

Figure 2:
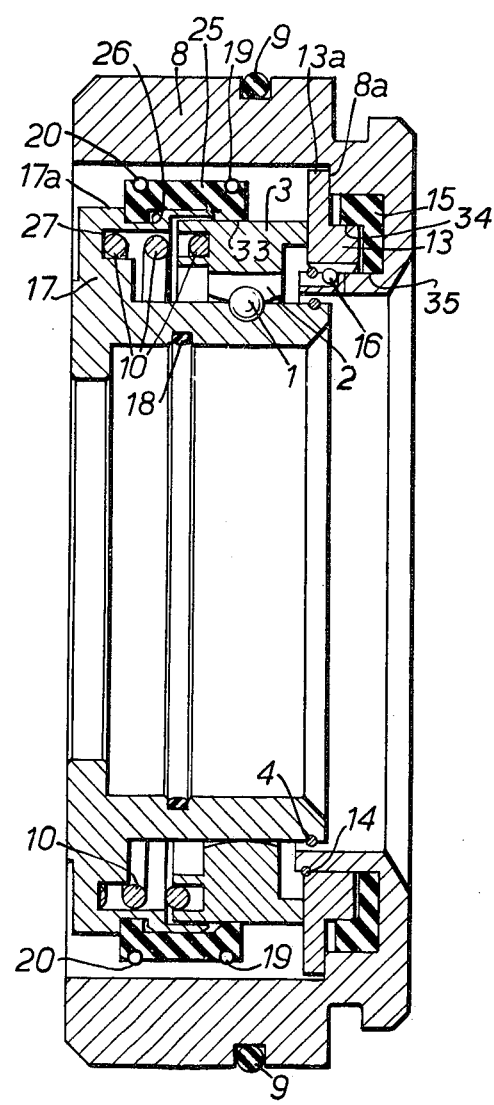

Referring now to FIG. 2, the flexible cuff 5 of FIG. 1, which provided the seal between sleeve 17 and floating ring 3 and was designed to flex to accommodate relative movement between these parts whilst maintaining sealing engagement with both, is replaced in the construction of FIG. 2 with a U-section sealing ring 25 designed to provide a sliding seal at 33 with floating ring 3 so that it need not flex to accommodate relative axial movement between ring 3 and sleeve 17. Ring 25 is located outside spring 10 instead of inwardly of such spring as in FIG. 1. To accommodate this form of sealing ring, the sleeve 17 is extended radially outwardly and is formed with an axially directed extension 17a providing in its outer surface an annular groove 26 to receive one limb of the U-section of ring 25 which is held in groove 26 by spring belt 20. Beyond such groove the extension 17a provides a support for the centre of the base of the U-section of ring 25. At the junction of extension 17a is formed an annular recess 27 to accommodate one end of pressure spring 10 the other end of which is accommodated in an annular recess in the face of floating ring 3 which faces sleeve 17. The radially outward surface of ring 3 is of simple cylindrical form and against this cylindrical surface the other limb of the U-section of ring 25 is urged by spring belt 19 to form a sliding seal.

With this construction the cover plates 11 and 12, the backing plate 6, and the retaining plate 7 of FIG. 1 are no longer necessary and any fluid pressure in the casing 8 tends to force ring 25 radially into firmer sealing engagement with extension 17a and floating ring 3. Additionally the tendency of such fluid pressure, in the construction of FIG. 1, to drive floating ring 3 and thus rubbing ring 13 against cuff 15 is entirely eliminated.

The L-shaped cuff 15 disposed between the casing 8 and the rubbing ring 13 is of the same form in both FIGS. 1 and 2 of the drawings but in the construction of FIG. 2 the rubbing ring 13 is formed with an outer flange 13a and the casing 8 is formed with step 8a serving as an abutment for the flange 13a. The disposition of ring 13 relative to cuff 15 is such that when flange 13a abuts step 8a there are clearances between confronting surfaces of ring 13 and cuff 15. Thus flange 13a prevents axially directed forces exerted by the floating ring 3 upon the rubbing ring 13 affecting the cuff 15.

The cuff 15 is sealed at its radially inward facing surfaces to the ring 13 and to the wall of the recess in the casing 8 as indicated at 34 and 35. Thus when the flange 13a is spaced from step 8a the fluid pressure in the casing 8 imparts a thrust to the ring 13 in the direction towards the floating ring 3 in a sense to supplement the contact pressure between rings 3 and 13 by virtue of the fact that the diameter at surface 34 is less than the diameter at surface 33 and the overall fluid thrust on flange 13a is towards ring 3. This thrust towards ring 3 is further supplemented by fluid passing around between cuff 15 and the radial wall of the casing recess. A further manner of supplementing the contact pressure between rings 3 and 13 above that provided by spring 10 by allowing fluid pressure within the casing 8 to exert a thrust upon ring 13 in a direction towards ring 3 is shown in FIG. 3A.

In FIG 3A the limiting abutment to prevent extrusion of cuff 15 is provided between a step 8b of casing 8 and ring 13. The cuff 15 is sealed at its radially inward facing surfaces at 34 and 35 with the ring 13 and the step 8b. Fluid is able to pass behind the cuff 15 between the cuff 15 and the radial wall of the casing recess housing the cuff 15. Fluid pressure in casing 8 is thus able to act between the walls of the recess housing cuff 15 and the cuff itself and by appropriate selection of the relative diameter of the inner sliding contact surface 35 of cuff 15 with casing 8 and of the outer surface 33 of ring 3 where it bears against ring 13 so that the latter diameter is slightly larger than the former this fluid pressure applies a thrust to cuff 15 and thus to ring 13 urging the latter towards ring 3. The magnitude of such thrust depends upon the fluid pressure and the difference in surface areas upon which it acts in opposite directions due to the difference in the two diameters. To achieve this supplement of the contact pressure between rings 3 and 13 it is of course necessary that the arrangement of the locking ball 16 and the circlip 14 should allow a limited degree of axial movement of ring 13.

FIG. 3b shows a modification of the arrangement of FIG. 3a in which the step 8b has greater radial depth and the inner diameter of the limb of cuff 15 which contacts step 8b at 35 is only slightly different from the outer diameter of ring 13 at 34. Such an arrangement is suited to the case where the outer diameters of rings 3 and 13 are the same and a pressure supplement is desired.

FIG. 3c shows a further modification of the arrangement of FIG. 3a in which the L-shape of cuff 15 is eliminated the cuff being of rectangular shape in cross section. This arrangement is suitable where the outer diameter of ring 3 is greater than that of ring 13, the cuff 15 being retained in position in the recess in casing 8 by a flange 13b formed on ring 13.

The U-shaped cuff 25 of the sleeve 17 in FIG. 2 can also be used in place of the L-shaped cuff in the housing 8, as shown in FIG. 4. In the arrangement of this FIG. 4 the rubbing ring 13 has an axially extending recess in register with a similar recess formed in casing 8 and a locking peg 30 extends into both recesses. The ring 13 and the casing 8 each have radially outwardly directed flanges 13c and 8c and a U-shaped cuff 15 is located with one limb located in a recess in casing 8 and the other disposed around the outer periphery of ring 13 with the base of the U-shape bridging across the flanges 13c and 8c. The free end surface 31 of one limb forms a seal to the ring 13 and the free end surface 32 of the other limb forms a seal to the casing 8. As in the case of the arrangement of FIG. 3c, this arrangement cannot provide a fluid pressure derived thrust of ring 13 against ring 3 opposed to the pressure exerted by spring 10.

Referring now to FIG. 5, the arrangement of the sleeve 17, floating ring 3 and U-shaped seal 25 are largely the same as in FIG. 2 but the arrangement of the rubbing ring 13 and the housing 8 is modified to eliminate the L-shaped cuff seal of FIG. 2. The ring 13 has a radially extending groove 22 through most of its thickness which divides it into a relatively thick flange 23 and a relatively thin flange 24 of larger out-side diameter than flange 23. The ring 13 is held in position in the housing 8 by a cylindrical housing liner 8a which abuts the outer periphery of flange 24 and holds it between the end face of liner 8a and the confronting face of the housing 8.

As in the arrangement of FIG. 2, the U-shaped cuff 25 is secured to sleeve 17 and has a wiping engagement with the outer periphery of floating ring 3 at 33 radially outwardly of ball 1. The radial end face 26 of cuff 25 is located on the centre line of ball 1 and key 2 so that any tilting movement of floating ring 3 relative to the sleeve 17 produces the minimum of flexure of cuff 25. The actual rubbing surface of floating ring 3 bearing against ring 13 is provided by a flange formation 3a which extends both radially and axially beyond the main body of ring 3. The outer diameter of formation 3a at 36 is chosen to be a little greater than the inner diameter of the limb of cuff 25 which forms a sliding seal against ring 3 at 33. The fluid pressure within the casing 8 acting upon the annular step surface between 33 and 36 provides a supplement to the thrust exerted by spring 10 urging ring 3 into contact with ring 13.

Referring to FIG. 6, there is shown a modified form of the sleeve and cuff arrangement of FIG. 5, the casing 8 being omitted for simplicity of illustration, in which the cuff 25 is secured to the floating ring 3 and has sliding engagement with the radially outer periphery of sleeve 17 at 33. The radially extending portion of the flange formation 3a in this figure extends outwardly to the full outer diameter of cuff 25 and a supplement to the pressure exerted by spring 10 is achieved by appropriate choice of the diameters of the radially outer cylindrical surface 36 of the axially extending portion of flange 3a and of the contact surface 33 between cuff 25 and sleeve 17.

FIG. 7 shows an alternative form of the sleeve sealing arrangements of FIG. 5 in which the U-section cuff 25 is located radially inwardly of the spring 10 instead of radially outwardly of such spring. In this construction the sleeve is formed as an inner sleeve 17 and an outer sleeve 17a held together by a circlip 30. The cuff is secured in a recess in the inner sleeve 17 by the outer sleeve 17a and projects into an axial recess formed in the floating ring 3. The of the limb of cuff 25 which forms a sliding seal against ring 3. The fluid pressure within the casing 8 acting upon the annular step surface between 28 and 29 provides a supplement to the thrust exerted by spring 10 urging ring 3 into contact with ring 13.

Referring to FIG. 6, there is shown a modified form of the sleeve and cuff arrangement of FIG. 5, the casing 8 being omitted for simplicity of illustration, in which the cuff 25 is secured to the floating ring 3 and has sliding engagement with the radially outer periphery of sleeve 17. The radially extending portion of the flange formation 3a in this figure extends outwardly to the full outer diameter of cuff 25 and a supplement to the pressure exerted by spring 10 is achieved by appropriate choice of the diameters of the radially outer cylindrical surface 28 of the axially extending portion of flange 3a and of the contact surface 29 between cuff 25 and sleeve 17.

FIG. 7 shows an alternative form of the sleeve sealing arrangements of FIG. 4 in which the u-section cuff 25 is located radially inwardly of the spring 10 instead of radially outwardly of such spring. In this construction the sleeve is formed as an inner sleeve 17 and an outer sleeve 17a held together by a circlip 30. The cuff is secured in a recess in the inner sleeve 17 by the outer sleeve 17a and projects into an axial recess formed in the floating ring 3. The axially extending flange 3a of ring 3 is located radially inwardly of the radially outer surface of cuff 25. The spring 10 is located partly in an axial recess in outer sleeve 17a and partly in the axial recess in ring 3, the outer diameter of the ring 3 and sleeve 17a being the same. The radial end face of cuff 25 adjacent the area of sliding contact of the cuff with the ring 3 is located on the centre line through the ball 1 and key 2 to secure minimal flexure of cuff 25 upon tilting of ring 3 and the outer diameter 36 of the flange 3a of the ring 3 is greater than that of the surface 33 of ring 3 contacted by the cuff 25 to provide a pressure supplementing arrangement.

FIG. 8 shows a modification of the arrangement of FIG. 7 wherein the sleeve 17 is in one piece but the floating ring 3 is formed as an inner ring and an outer ring secured together by a circlip 31. The spring 10 is housed partly in an axial recess in sleeve 17 and partly in a registering axial recess in the outer ring of the floating ring 3. The cuff 25 is secured in an axial recess in the inner ring of floating ring 3 by the outer ring and has a sliding contact with a surface of the sleeve 17 at 33. The arrangements for pressure supplementing are the same as in FIG. 7.

What I claim is:

1. A gland for making a fluid-tight seal between a casing and a sleeve which are rotatable with respect to each other, said gland comprising a rubbing ring mounted in said casing, a floating ring keyed to said sleeve, a spring acting between said sleeve and said floating ring to urge said floating ring into engagement with said rubbing ring, a sealing ring of fluid-resistant elastomeric material having a first part mounted in a recess in one of said sleeve and said floating ring to form a seal with at least one wall surface of said recess and a second part forming a sliding seal with the surface of the other of said sleeve and floating ring, an L-shaped rubbing ring having first, second and third surfaces, said first surface abutting said floating ring, said second surface substantially parallel to said first surface and adapted to abut a step in said casing when said second surface is urged towards said step, said third surface substantially perpendicular to said second surface and intersecting said second surface, a cuff positioned between said casing and rubbing ring and forming a seal with said third surface of said rubbing ring, said cuff spaced from said second surface of said rubbing ring, the outer diameter of said floating ring where it abuts said first surface of said rubbing ring being greater than the inner diameter of said cuff where it forms said seal with said rubbing ring, whereby fluid pressure in said casing exerts pressure on only said rubbing ring in a sense which tends to increase the contact pressure between said rubbing and sealing rings when said second surface of said rubbing ring is spaced from said step.

2. A gland as claimed in claim 1 wherein said spring is a coil spring disposed radially inwardly of said sealing ring.

3. A gland as claimed in claim 1 wherein said floating ring is keyed to said sleeve by means of a driving ball and a driving key and said sealing ring is disposed with a radially extending end face lying on a common centre line of said ball and key.

4. A gland as claimed in claim 3 wherein said end face of the sealing ring is the end face of the part of the sealing ring making said sliding seal.

5. A gland as claimed in claim 1 wherein said floating ring is formed of an inner ring and an outer ring secured together by releasable securing means, said inner ring having a recess therein to receive one part of said sealing ring and said outer ring serving to secure said one part of said sealing ring in said recess.

* * * * *